Sept. 20, 1971 C. W. THORSON 3,605,809
HYDRAULIC VALVE

Filed Oct. 29, 1969 5 Sheets-Sheet 1

INVENTOR.
CLAYTON W. THORSON
BY Robert W. Doyle
ATTORNEY

Sept. 20, 1971  C. W. THORSON  3,605,809
HYDRAULIC VALVE

Filed Oct. 29, 1969  5 Sheets-Sheet 2

Fig 2

INVENTOR.
CLAYTON W. THORSON
BY Robert W. Doyle
ATTORNEY

Sept. 20, 1971    C. W. THORSON    3,605,809
HYDRAULIC VALVE

Filed Oct. 29, 1969    5 Sheets-Sheet 4

INVENTOR.
CLAYTON W. THORSON
BY Robert W. Doyle
ATTORNEY

United States Patent Office
3,605,809
Patented Sept. 20, 1971

3,605,809
HYDRAULIC VALVE
Clayton W. Thorson, Edina, Minn., assignor to Eaton Yale & Towne Inc., Cleveland, Ohio
Filed Oct. 29, 1969, Ser. No. 872,114
Int. Cl. F16k 11/02, 31/143
U.S. Cl. 137—624.27                                7 Claims

ABSTRACT OF THE DISCLOSURE

A four-way, three position, hydraulic valve of the automatic return to neutral type wherein the automatic return mechanism is protected from flow of working fluid and is sensitive and responsive to system fluid flow from approximately ½ g.p.m. to over 20 g.p.m.

SUMMARY OF THE INVENTION

This invention relates to a four-way, three position, hydraulic valve and, more particularly, relates to a flow control valve of the automatic return to neutral type wherein the automatic return mechanism is protected from working fluid flow and is responsive, over a wide range of flow rates, to system fluid flow.

BACKGROUND OF THE INVENTION

Flow control valves of the automatic return to neutral type are well-known in the art. A typical example of a four-way, three position, automatic return to neutral flow control valve may be found in U.S. Pat. No. 2,800,922 entitled "Hydraulic Valve," issued to Lynn L. Charlson on July 3, 1957. The automatic return to neutral valve typically responds at the end of a work cycle, automatically returning the spool to a neutral position. In the valve of Charlson, as in the valve herein, the automatic return to neutral mechanism is flow responsive. At the end of a work cycle, there is a pressure buildup in the valve, resulting in the unseating of a relief valve allowing system fluid flow to the automatic return to neutral mechanism. The automatic return mechanism responds to predetermined flow rates causing the spool to return to neutral when subjected to fluid flow between the predetermined limits.

It should be noted that valves of the type described in Charlson, and herein, are used in a system to control flow of fluid to a hydraulic device, typically a rotary motor or a linear motor, i.e., a cylinder. The tandem center valve is one in which the working ports are blocked when the spool is in neutral. The pressure and return lines are interconnected. An open center valve is one in which all ports are interconnected in neutral. Generally, a system which requires a rotary motor, will utilize an open center valve. A system which utilizes a linear motor will utilize a tandem center valve.

Since the automatic return to neutral mechanism must respond to system fluid flow, it must be constructed and arranged in the valve so that it is protected from working fluid flow. The pressure build-up in the valve, caused by the completion of a work cycle, causes system pressure to increase. Consequently, a pressure responsive relief valve opens and system fluid flow actuates the automatic return to neutral mechanism. In those prior art valves wherein working fluid flow contacts the automatic return to neutral mechanism, the return mechanism is less sensitive and, therefore, unreliable.

With these comments in mind, it is to the elimination of these and other disadvantages to which the present invention is directed, along with the inclusion therein of other novel and desirable features.

OBJECTS OF THE INVENTION

An object of this invention is to provide a new and improved flow control valve of the automatic return to neutral type of simple and inexpensive construction and operation.

Another object of this invention is to provide a novel flow control valve of the tandem or open center type having an automatic return to neutral mechanism responsive to a wide range of system fluid flow.

Still another object of this invention is the provision of a new and improved flow control valve of the automatic return to neutral type wherein the return mechanism is so constructed and arranged that it is protected from working fluid flow and is responsive to system fluid flow providing accurate and reliable responsiveness over a wide range of flow rates.

These and other objects and advantages of this invention will more fully appear from the following description made in connection from the accompanying drawings wherein like reference characters refer to the same or similar parts throughout the several views.

DESCRIPTION OF THE DRAWINGS

FIG. 2 is a sectional plan view of a tandem center valve of this invention with the spool in neutral.

DESCRIPTION OF THE INVENTION

Figure 1:
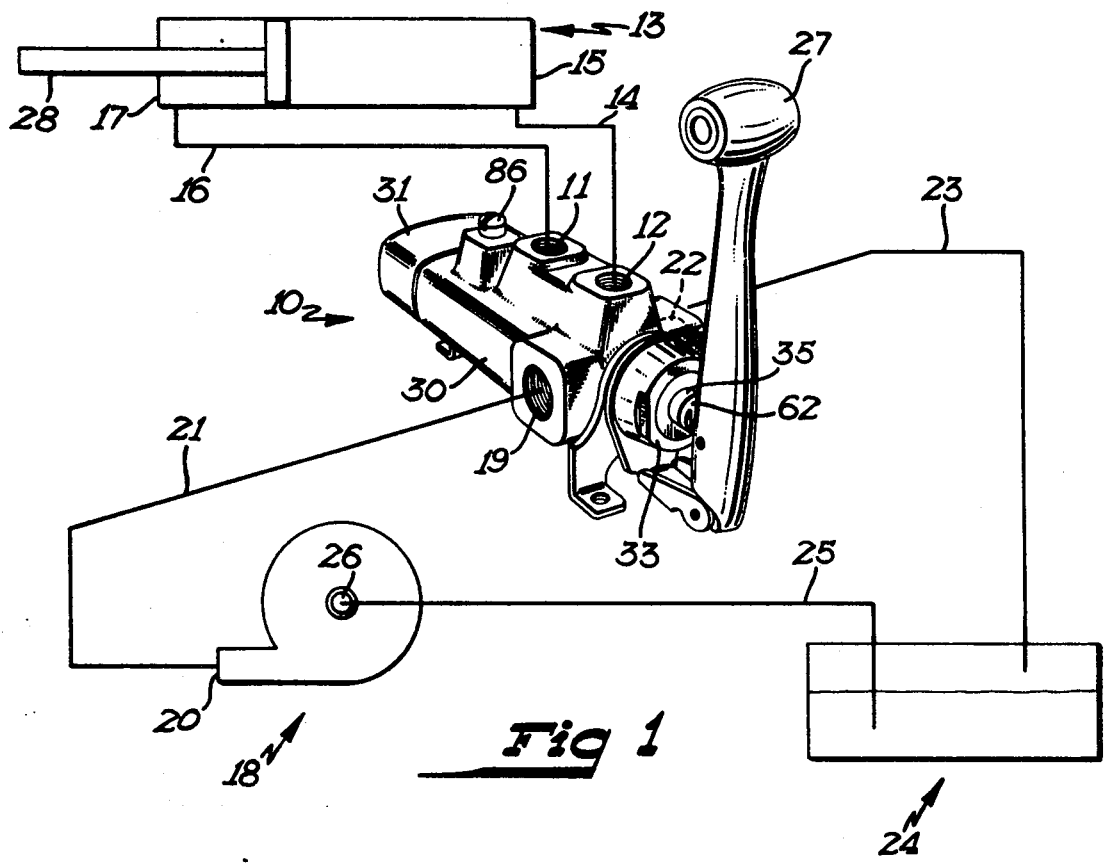
FIG. 1 is a diagrammatical view showing the valve of this invention as it would be arranged, for example, in a fluid pressure system to control a hydraulic motor of the linear or rotary type.
Figure 5:
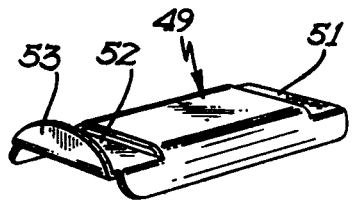
FIG. 5 is a perspective view showing the shuttle detail for the automatic return to neutral mechanism.
Figure 3:
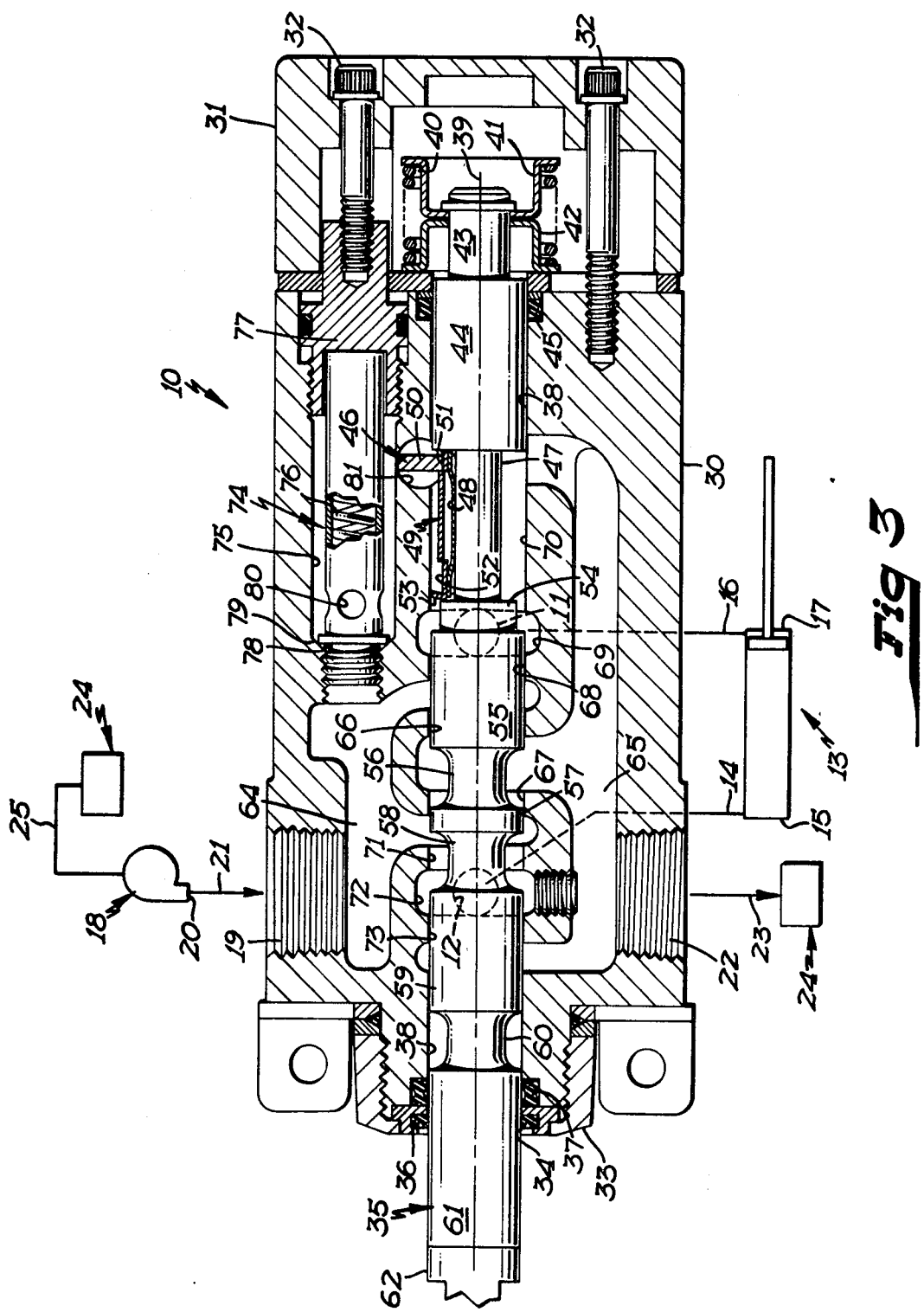
FIG. 3 is a sectional plan view of a tandem valve of this invention with the spool in the "out" position.

Referring now to FIG. 1, the valve of this invention is shown, diagrammatically, in a system of the type in which the valve is used. The valve is indicated, in general, by reference numeral 10. The valve includes a pair of working ports 11 and 12 connected to a hydraulic motor, indicated, in general, by reference numeral 13. For illustrative purposes only, the hydraulic motor shown is a cylinder, or linear motor. It should be noted that a rotary motor may be utilized as well. A working fluid conducting conduit 14 connects working port 12 with anchor end 15 of cylinder 13. Fluid conducting conduit 16 connects working port 11 with ram end 17 of motor 13.

A hydraulic pump, indicated in general by numeral 18, supplies fluid under pressure to valve 10 at valve inlet port 19. Pump 18 is connected, at its discharge side 20, to system fluid conducting conduit 21. Fluid is exhausted from the valve through outlet port 22, to which system fluid conducting conduit 23 is connected to carry fluid back to a reservoir, indicated in general by numeral 24. Completing the circuit, system fluid conducting conduit 25 joins reservoir 24 with pump 18 at inlet 26.

Manipulation of valve actuating lever 27 causes fluid flow from pump 18 to be directed according to the setting. For example, working fluid flow may be directed outwardly of valve 10 through working port 12 urging ram 28 of cylinder 13 outwardly to a predetermined position at which system pressure builds up and the valve spool is caused to return to neutral. As ram 28 is urged outwardly, return fluid is conducted by conduit 16 into working port 11 and outwardly therefrom at valve outlet port 22 returning the fluid to reservoir 24.

Referring now to FIG. 2, the valve of this invention is shown in a sectional plan view in order to illustrate the flow of fluid through the valve in a schematic way. The four-way, three position valve is shown with the spool in neutral. Although the valve shown is a tandem type, it may be readily converted to an open center type by simply interconnecting the working ports by modification to the spool as is well-known in the art. Valve 10 includes a housing or body 30, typically constructed of cast iron. End cap 31 is attached to body 30 by a plurality of bolts 32. Front end cap 33 is connected to valve body 30 and includes an opening 34 therein adapted to receive valve spool 35 for slideable axial movement therein. Seals 36 and 37 provide a seal between spool 35 and opening 34.

Spool 35 is generally elongate and is positioned in axial bore 38 of housing 30 for slideable axial movement along axis 39 in response to manipulation of spool actuating lever 27. Spool 35 includes a plurality of fluid controlling lands and grooves mating with fluid controlling lands and grooves in valve housing 30 at predetermined positions of spool 35 as will be described hereinbelow.

Spool 35 is movable axially along axis 39 and is biased in the neutral position by centering spring 40 in end cap 31. Spring 40 is caged between a pair of spring receiving members 41 and 42, each of which is mounted on journalled portion 43 of spool 35. Spring 40 separates spring receiving member 41 from spring receiving member 42. In the spool "out" position, spring receiving member 41, to which spring 40 is connected, is guided inwardly along journalled portion 43, compressing the spring and therefore urging the spool 35 to the neutral position. Correspondingly, in the spool "in" position, spring receiving member 42 is urged toward spring receiving member 41, compressing the spring and urging spool 35 outwardly to the neutral position. Rear sealing portion 44 of spool 35 is surrounded by seal 45, sealing end cap 31 from fluid flow. The automatic return to neutral mechanism of valve 10 is shown, and indicated in general by numeral 46. The automatic return to neutral mechanism is mounted at journalled portion 47 of spool 35 and includes bias spring 48 and shuttle 49. Spring 48 urges shuttle 49 against detent 50. Shuttle 49 includes a spool "out" detent engaging lip 51 and a spool "in" detent receiving lip 52. In the neutral position, of course, the detent simply urges shuttle 49 inwardly compressing spring 48. Although the shuttle and spring move axially with spool 35, detent 50 is stationary relative thereto. It should be noted that shuttle 49 includes a sealing lip 53.

Spool 35 includes first journalled portion 54 providing fluid communication with first working port 11 in the spool "out" position. First working port blocking portion 55 of spool 35 provides blocking of first working port 11 in the neutral position. First neutral journalled portion 56 of spool 35 provides fluid communication between inlet 19 and outlet 22. Separating land 57 provides separation between the inlet 19 and outlet 22 in the spool "in" or spool "out" position directing fluid flow to a predetermined of the first and second working ports 11 and 12, respectively, and allowing fluid to flow inwardly to the valve from the other working port and be directed to outlet port 22. Second neutral journalled portion 58 provides fluid communication between inlet port 19 and outlet port 22 in the neutral position of spool 35. Second working port blocking portion 59 is shown in neutral, blocking second working port 12 preventing fluid flow therethrough or into the valve therefrom. Second journalled portion 60 is inoperative in the neutral position of spool 35, but in the spool "in" position, allows fluid communication between second working port 12 and outlet 22. Lever end sealing portion 61 of shaft 35 projects outwardly of valve 10 at bore 34 of end cap 33. Lever connection portion 62 is connected to valve actuating lever 27 by pin connection 63.

Fluid under pressure enters valve body 30 at inlet port 19 which is in fluid communication with inlet cavity 64 which, in turn, is in fluid communication with bore 38 at predetermined positions of spool 35. As shown in FIG. 2 the spool is in the neutral position and fluid communication is provided between inlet cavity 64 and outlet cavity 65 which contains fluid at down-stream or exhaust pressure. A pair of opposed first and second separating lands 66 and 67, respectively, separate inlet cavity 64 from outlet cavity 65 in the spool "in" or spool "out" positions of spool 35, causing fluid to flow from inlet cavity 64 to either of working ports 11 or 12 as will be described hereinbelow. Housing 30 includes first inlet fluid sealing land 68 and first working port groove 69 in communication with first working port 11. Separating land 57 mates with first separating land 66 of housing 30, in the spool "in" position, causing system fluid to be separated from outlet cavity 65 and directed into working port 11, outwardly therefrom to motor 13 and inwardly from motor 13 into second working port 12. Working fluid flows around second journalled portion 60, in fluid communication with working port 12, into cavity 65 allowing fluid to flow outwardly from outlet port 22. In the spool "out" position and in the neutral position, it should be noted that flow from inlet cavity 64 to working first port 11 is blocked by first inlet fluid sealing land 68 which is in tight sealing engagement with spool 35 at first working port blocking portion 55 thereof. In the neutral position, first outlet fluid sealing land 70 separates system fluid in cavity 65, which is in fluid communication with bore 38, from working port 11 since land 70 is in sealing engagement with the first working port blocking portion 55 of spool 35.

Second inlet fluid sealing land 71 mates with second working port blocking portion 59 in tight sealing engagement and in slideable relation therebetween preventing fluid flow from inlet cavity 64 through second working port 12. Second working port groove 72 is in fluid communication with second working port 12 and, in the spool "out" position, fluid flow from cavity 64 is around second neutral journalled portion 58, into second working port groove 72, and outwardly therefrom through working port 12. In the neutral position of spool 35, second outlet fluid sealing land 73, in combination with mating second working port blocking portion 59 prevents fluid flow between cavity 65 and working port 12.

A cylindrically shaped relief valve cartridge assembly 74 is inserted in check valve receiving bore 75, in fluid communication with bore 38 in housing 30. Cartridge 74 includes spring 76 caged therein between bottom portion 77 and valve head or piston seal 78. Piston seal 78 seats in mating seat 79. A plurality of openings in cartridge 74 allow system fluid in cavity 64 at a predetermined pressure, to overcome the bias force of spring 76 and unseat piston seal 78 providing system fluid flow inwardly of the cartridge and outwardly through openings 80 into bore 75. Bore 75 is in fluid communication with the automatic return to neutral mechanism 46 since system fluid may flow through opening 81 which contains detent 50.

Figure 4:
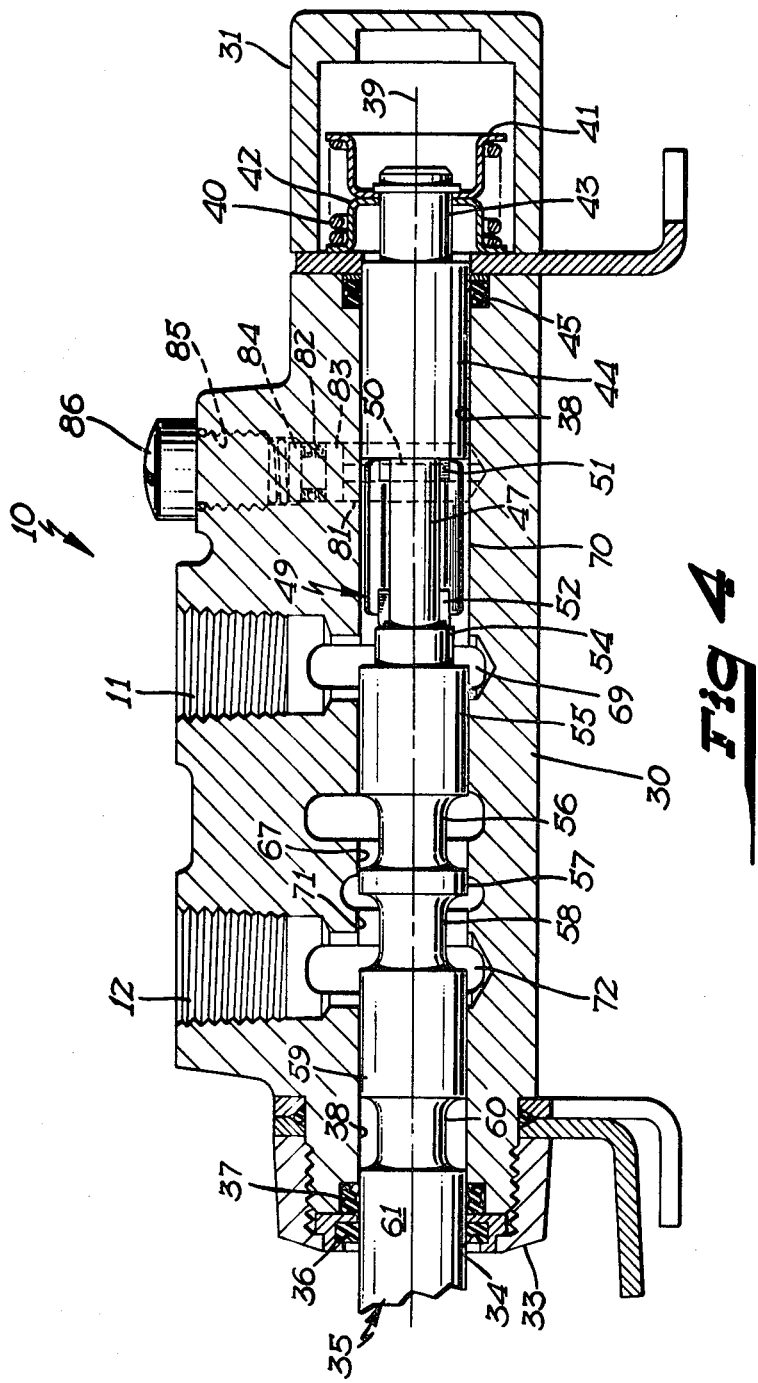
FIG. 4 is a sectional elevational view of a tandem valve of this invention with the spool in the "out" position.

Referring now to FIG. 4, the automatic return to neutral mechanism is shown in detail. Detent 50 is shown in cylindrical upright bore 81 positioned maintaining spool 35 in the spool "out" position. Detent 50 is maintained downwardly in bore 81 by adjustable biasing spring 82 caged between washers 83 and 84. Threaded opening 85 receives adjustment bolt 86 which increases or decreases the biasing force of spring 82.

Figure 6:
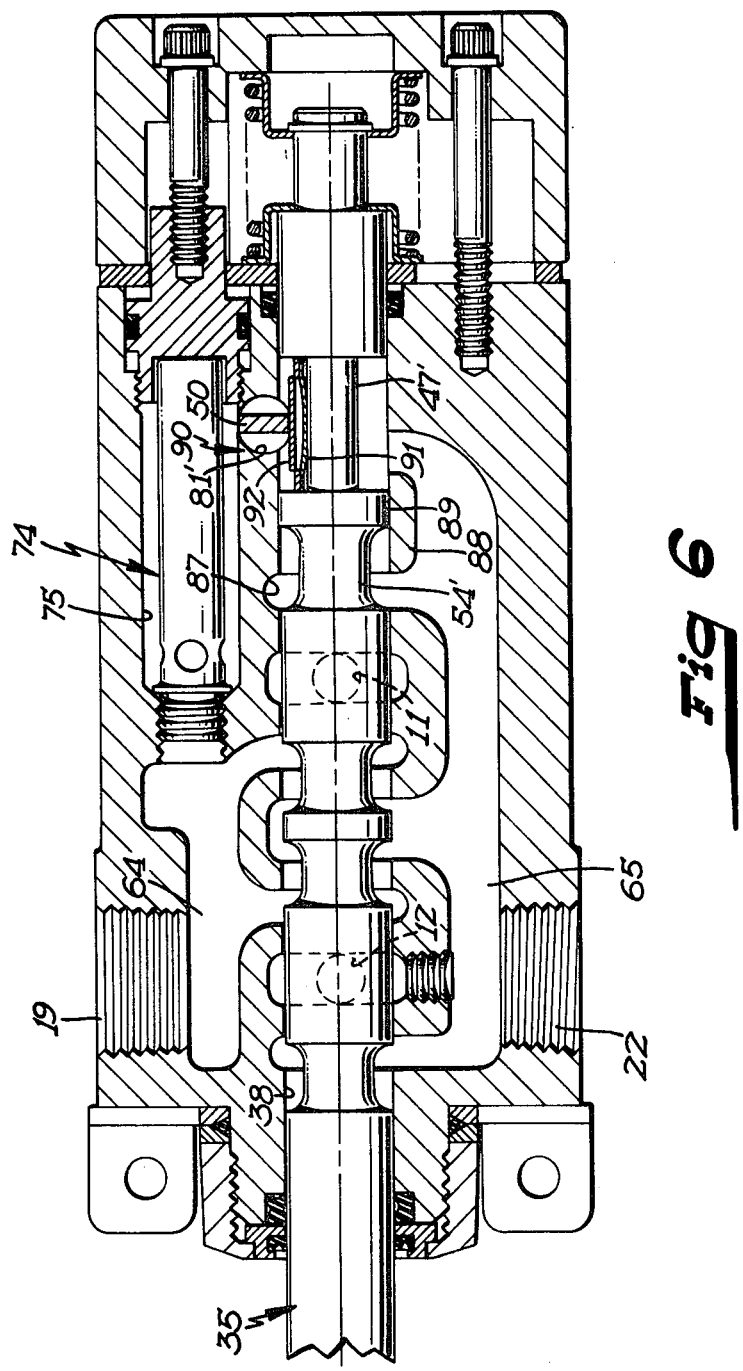
FIG. 6 is a sectional plan view of an alternate embodiment of the valve of this invention showing a tandem valve with the spool in the neutral position.

An alternate embodiment of this invention is shown in FIG. 6. The alternate embodiment affords total isolation of the automatic return to neutral mechanism from fluid entering the working port. The spool is shown in the neutral position. System fluid enters port 19 and system fluid exits at port 22. In the spool "out" position, fluid under pressure enters port 19 in fluid communication with incoming cavity 64; fluid flow is then outwardly through second working port 12 and inwardly at first working port 11. Fluid flow inwardly from working port 11 is around spool journalled portion 54' and into fluid receiving groove 87 which is in fluid communication with outlet cavity 65. Shuttle sealing land 88, in combination with spool shuttle sealing land 89, isolates fluid entering working port 11 from the shuttle mechanism, indicated in general by reference numeral 90. Spring 91 urges shuttle 92 against detent 50. The automatic return to neutral mechanism 90 is positioned at journalled portion 47' of spool 35. At the end of the working cycle, cartridge relief valve mechanism 74 is actuated and system fluid flows from cavity 64 through the relief valve system into bore 75 which is in fluid communication with bore 81'. Detent receiving bore 81' is in fluid communication with spool receiving bore 38 which, in turn, is in fluid communication with outlet cavity 65. Fluid under pressure flowing around detent mechanism 90 at the predetermined flow rate overcomes shuttle biasing spring 91 and releases the shuttle from the detent and the valve returns to the neutral position shown. Spool sealing land 89, in combination with housing land 88, prevents fluid under pressure from mixing with incoming fluid at working port 11.

DESCRIPTION OF THE OPERATION

The valve described herein is a directional control valve. Its function is to receive system fluid under pressure and direct the system fluid through either of a pair of first and second working ports, and receive the working fluid into the valve at the other of the first and second working ports, returning the working fluid to a system fluid receiving reservoir. The operation of the tandem, automatic return to neutral valve type will be described first.

Pump 18 provides fluid under pressure at inlet 19. Inlet cavity 64 is in communication with inlet 19. First and second working ports 11 and 12, respectively, are blocked by first and second spool working port blocking portions 55 and 59 respectively. Fluid flow from cavity 64 is therefore around first and second separating lands 66 and 67 respectively, and through first and second neutral journalled portions 56 and 58, respectively, into outlet cavity 65 which is in fluid communication with outlet port 22. Outlet port 22 is connected to reservoir 24, completing the circuit for tandem neutral operation.

In the spool "out" position, system fluid provided at inlet port 19 to inlet cavity 64 is blocked from entering first working port 11 by the mating of first working port blocking portion 55 with first separating land 66. Fluid flow is further prevented from flowing directly from inlet cavity 64 to outlet gravity 65 by the mating of spool separating land 57 with second separating land 67. Fluid flow is around second neutral journalled portion 58 into second working port 12, at which point the system fluid becomes working fluid provided through conduit 14 to motor 13. Ram 28 of motor 13 is urged outwardly to the end of its stroke and displaced fluid is returned through conduit 16 to working port 11. Working port 11 receives the working fluid back into valve 10 and fluid flows therefrom into first working port groove 69 which is in fluid communication with bore 38. The automatic return to neutral mechanism 46 is substantially separated from, and unaffected by, flow of fluid returning to the valve through first working port 11. Further, shuttle lip 53, which mates with bore 38, prevents flow of working fluid around the automatic return to neutral mechanism, directing the fluid flow outwardly from bore 38 into cavity 65.

At the end of the stroke of ram 28, working fluid cannot flow outwardly from second working port 12 and, consequently, there is a pressure build-up within inlet cavity 64. This pressure build-up is relieved by relief valve assembly 74, and the unseating piston 78 from seat 79. System fluid flow is then through cartridge assembly 74, outwardly of openings 80 and into bore 75 which is in fluid communication with bore 81. Bore 81, in turn, is in fluid communication with axial bore 38 of valve 10 and system fluid flow impinges upon shuttle 49, overcoming the shuttle biasing force provided by spring 48, releasing shuttle 49 from detent 50 to allow centering spring 40 to urge spool 35 to its neutral position.

The operation of the tandem center valve for the spool "in" position is substantially as described above and will not be elaborated further herein.

The operation for the open center valve is substantially the same as for above. However, the open center spool provides communication between all ports, including inlet and outlet ports 19 and 22, respectively, and first and second working ports 11 and 12, respectively. Interconnection is provided by simply axially slotting first and second working port blocking portions 55 and 59, providing fluid communication between inlet 64 and the working ports and first and second neutral journalled portions 56 and 58 respectively. The operative positions of spool 35 provide the same flow as described for the tandem center valve.

From the foregoing, it will be seen that I have provided a new and novel four-way, three position hydraulic valve of the automatic return to neutral type wherein the automatic return mechanism is protected from flow of working fluid and is therefore sensitive and responsive to system fluid flow over a wide range of flow rates. Further, the valve is adaptable as a tandem or open center valve whereby either a linear or rotary motor may be properly and effectively controlled without sacrificing the reliability of the automatic return to neutral mechanism.

What is claimed is:

1. A four-way, automatic return to neutral directional control valve, said valve comprising
    a valve housing having an inlet port adapted to be connected to a source of system fluid, an outlet port adapted to be connected to a reservoir for system fluid, first and second working ports adapted to conduct working fluid under pressure through one of said first and second ports and return working fluid through the other of said first and second ports, an axially oriented spool receiving bore in fluid communication with said inlet and outlet ports and said first and second working ports, said spool receiving bore having a plurality of fluid directing lands and grooves,
    a valve spool mounted in said axial bore for slideable movement therein between a neutral and an operative position, said spool including a plurality of lands and grooves mating with a plurality of lands and grooves within said valve housing whereby, in the spool neutral position, said inlet and outlet ports are interconnected providing fluid communication therebetween, and wherein said spool, in its operative position, directs system fluid from said inlet port into working fluid at one of said first and second working ports and outwardly therefrom and returning the working fluid at the other of said first and second working ports in fluid communication with said outlet port,
    a spool bias centering mechanism connected to said spool urging said spool from its operative position to its neutral position,
    lever means connected to said spool providing axial movement to said spool in response to manipulation of said lever whereby said spool may be positioned between its neutral position and its operative position,
    an automatic return to neutral mechanism, responsive to system fluid flow at a predetermined pressure, said return mechanism mounted in said valve housing means in said housing tending to divert working fluid flow conveyed by said first and second working ports from said automatic mechanism, said return mechanism comprising a shuttle detent mounted in said housing, and a shuttle and shuttle biasing element mounted on said spool and axially slideable therewith, said shuttle having a detent engaging lip adapted to mate with said detent and hold said spool in its operative position overcoming the biasing force of said spool centering mechanism, and a pressure sensitive relief valve mechanism mounted in said housing, said relief valve mechanism responsive to system fluid at a predetermined pressure and including a cooperating valve head and seat arrangement, said valve head adapted to unseat at a predetermined pressure of fluid allowing system fluid to flow therethrough into contact with said automatic return to neutral mechanism and, at a predetermined flow rate, actuate said shuttle urging said shuttle against its shuttle biasing element, overcoming the bias element and releasing said shuttle from said detent, allowing said spool centering mechanism to urge said spool to return to neutral.

2. The four-way, automatic return to neutral directional control valve of claim 1, wherein
said first and second working ports are blocked in the neutral position of said valve spool.

3. The four-way, automatic return to neutral directional control valve of claim 1, wherein
said valve spool is mounted in said axial bore for slideable movement between a neutral and an operative spool "out" position and between a neutral and an operative spool "in" position whereby fluid may be directed to a predetermined one of said working ports.

4. The four-way, automatic return to neutral directional control valve of claim 1, wherein
the shuttle of said automatic return to neutral mechanism includes a sealing lip projecting outwardly therefrom and mating with the axial spool receiving bore of the said valve housing whereby working fluid is substantially isolated from said automatic return to neutral mechanism.

5. The four-way, automatic return to neutral directional control valve of claim 1, wherein said valve spool includes
a shuttle sealing land and
the spool receiving bore includes a shuttle sealing land mating with the shuttle sealing land of said valve spool whereby said automatic return to neutral mechanism is isolated from working fluid.

6. The four-way, automatic return to neutral directional control valve of claim 5, wherein
said valve spool is mounted in said axial bore for slideable movement between a neutral and an operative spool "out" position and between a neutral and an operative spool "in" position whereby fluid may be directed to a predetermined one of said working ports.

7. The four-way, automatic return to neutral directional control valve of claim 1 wherein
said first and second working ports are in fluid communication in the neutral position of said spool.

References Cited

UNITED STATES PATENTS

| | | | |
|---|---|---|---|
| 2,800,922 | 7/1957 | Charlson | 137—624.27 |
| 3,125,120 | 3/1964 | Hasbany | 137—596.12 |

HENRY T. KLINKSIEK, Primary Examiner

U.S. Cl. X.R.

137—596.12, 625.69